(12) United States Patent
Ballos, III

(10) Patent No.: US 6,199,681 B1
(45) Date of Patent: Mar. 13, 2001

(54) CONVEYOR SYSTEM FOR OVERCOMING THE ELASTIC SPRINGBACK IN THE FLAPS OF AN EMPTY BOX

(76) Inventor: Pete Ballos, III, 161 Harter Ave. NW., Canton, OH (US) 44708

( * ) Notice: Subject to any disclaimer, the term of this patent is extended or adjusted under 35 U.S.C. 154(b) by 0 days.

(21) Appl. No.: 09/183,314

(22) Filed: Oct. 30, 1998

(51) Int. Cl.[7] ............................. B65G 47/26; B65G 15/00
(52) U.S. Cl. ........................................ 198/456; 198/836.2
(58) Field of Search ............................. 198/836.3, 836.2, 198/456, 457.02

(56) References Cited

U.S. PATENT DOCUMENTS

| | | | |
|---|---|---|---|
| 3,203,534 | * 8/1965 | Burkhardt et al. | 198/456 |
| 4,064,987 | 12/1977 | Rowan | 198/604 |
| 4,224,781 | 9/1980 | Salenbo | 53/473 |
| 4,285,679 | 8/1981 | Wahle | 493/125 |
| 4,437,851 | 3/1984 | Salenbo | 493/124 |
| 5,314,057 | 5/1994 | Calvert et al. | 198/483.1 |
| 5,372,569 | 12/1994 | Ballos, III | 493/316 |
| 5,551,555 | 9/1996 | Gladieux et al. | 198/836.3 |
| 5,735,378 | 4/1998 | Sundquist | 193/356 |

* cited by examiner

Primary Examiner—Robert P. Olszewski
Assistant Examiner—Bryan Jaketic
(74) Attorney, Agent, or Firm—Sand & Sebolt

(57) ABSTRACT

A conveyor system for retaining an empty box thereon includes a conveyor assembly slidably adjustable on a frame. The conveyor assembly includes a set of rollers rotationally mounted on a support rail attached to the conveyor assembly. A corresponding set of rollers are rotationally mounted to another support rail parallel and spaced apart from the first support rail and fixedly attached to the frame. The rotational axis of each of the rollers is angled forward in the direction of operative travel of the conveyor belt and box. In operation, the angled rollers snugly engage the box and urge the box against the conveyor belt when the box is translated thereby. The distance between the two sets of rollers is adjusted by sliding adjustment of the conveyor assembly with respect to the frame, thus providing for expedited set up of the conveyor system to handle boxes of different widths.

33 Claims, 6 Drawing Sheets

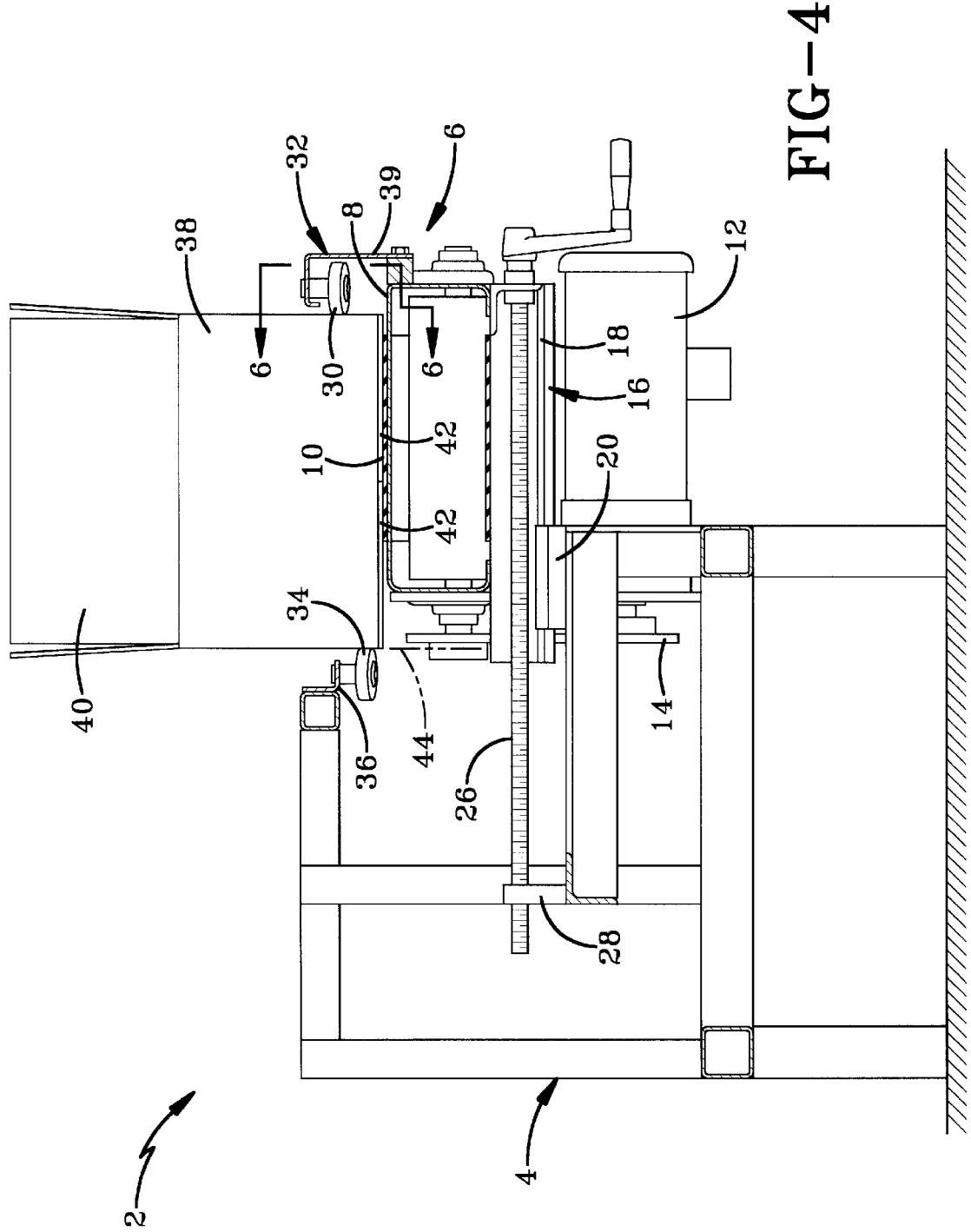

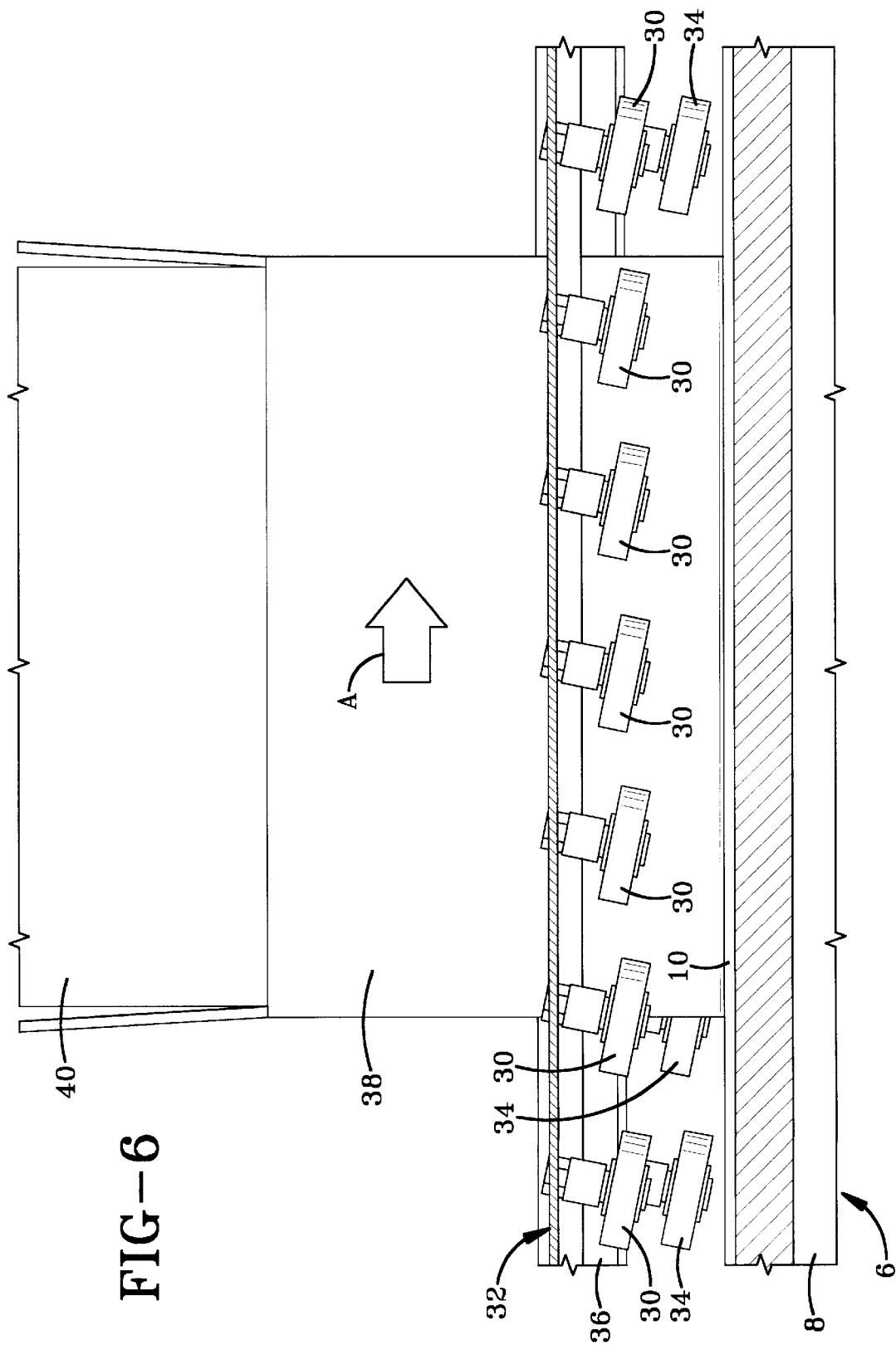

CONVEYOR SYSTEM FOR OVERCOMING THE ELASTIC SPRINGBACK IN THE FLAPS OF AN EMPTY BOX

BACKGROUND OF THE INVENTION

1. Technical Field

The invention relates generally to conveyor systems and, more particularly, to a conveyor system utilizing angled rollers for retaining an empty box on a conveyor belt as the box is transported along the conveyor belt. Specifically, the invention is a conveyor system that can deliver unassembled boxes of different sizes along a common index line and that utilizes angled rollers for retaining the boxes on the conveyor belt.

2. Background Information

Essentially all commercial goods travel through commerce enclosed in some type of packaging. Among the most common types of packaging are boxes (also referred to as cartons or cases) of a rectangular solid shape and that are typically manufactured of corrugated cardboard. Such boxes are of innumerable shapes and sizes suited to the specific needs of the packaging application. One such type of carton is a parallelepiped box with inward-turned flaps on at least the bottom thereof.

Unassembled parallelepiped cartons are typically cut from a single sheet of material and then formed into a generally tubular configuration having four sides. Each side terminates with a top flap and a bottom flap at opposite ends thereof. The top flaps and bottom flaps are folded inwardly and sealed to form top and bottom sides, respectively. Such cartons are typically shipped from a manufacturer in a flat configuration as blanks and must be assembled into a three-dimensional box prior to use. Such assembly can be by hand or through the use of a box erecting machine.

The flaps of a box are designated in the art as "major" and "minor" depending on their relative length. For instance, in a parallelepiped box having a length, a width, and a height, with the length and width being unequal, the major flaps are the two opposed flaps lying adjacent the longer of the length and width, with the minor flaps being the flaps adjacent the shorter of the length and the width. While many parallelepiped boxes contain bottom-forming flaps and top-forming flaps, some parallelepiped boxes contain only bottom-forming flaps, with the fully assembled box having an open top.

Parallelepiped boxes are assembled by first drawing the unassembled, flat box into a generally tubular rectangular shape. The minor flaps are each folded 90 degrees inward, with the major flaps then being folded 90 degrees inward and over the minor flaps. The flaps may then be sealed in place using glue, adhesive tape, gummed tape, or other such materials that are known and understood in the relevant art. In some situations, the bottom flaps are not sealed until after the box has been filled.

The bottom flaps of a parallelepiped box often are folded first with the top flaps being left open or unassembled so that the box can be filled with the appropriate contents. The box filling operation typically occurs on an open conveyor system. Such an open conveyor system typically contains a conveyor belt on which the boxes travel and sets of rollers on either side of the boxes parallel with the direction of belt travel to maintain boxes in the proper orientation as they travel down the conveyor belt for filling.

After a box has been filled, the final step is to fold and seal the top flaps of the box. The top flaps are assembled in a manner similar to the assembly of the bottom flaps, i.e., folding the minor flaps 90 degrees inward, folding the major flaps 90 degrees inward and over the minor flaps, and then sealing the major flaps in position with glue, adhesive tape, gummed tape, or the like. If the bottom flaps have not yet been sealed, they will typically be sealed at this point.

Such operations often are performed as part of an assembly line operation with the unfolded boxes being loaded into a magazine, each box being opened in turn and the bottom flaps thereof assembled to form a bottom. The boxes are then appropriately filled and the flaps thereof assembled.

When adhesive tape is utilized to seal the flaps of the box, the tape is typically delivered from a large roll attached to a tape head of the type known and understood in the relevant art. As indicated hereinbefore, the bottom flaps of a box may be folded prior to being filled and left unsealed until after the box has been filled and the top flaps have been folded into place. In such assembly lines, the bottom flaps and the top flaps of the boxes are typically sealed simultaneously by taping or gluing structures located both above and below the box assembly line.

One reason, among others, for performing the taping or gluing operations simultaneously on both the top and bottom flaps of a box is to facilitate replacement of tape rolls, refilling of glue reservoirs, etc., from a single location. Inasmuch as the boxes must typically be removed from the assembly line prior to replacing a tape roll, the removal of boxes from only one portion of the line while replacing the tape rolls on both the upper and lower taping mechanisms results in significant savings in cost and time. If the taping mechanisms for taping the top flaps and the bottom flaps are located at different points along the production line, boxes must be removed from both regions of the line to replace the tape rolls at those locations, thus requiring the expenditure of additional time and effort.

If the bottom flaps of a box are not sealed prior to being filled, the unsealed box must typically be held downward on the conveyor belt by a suitable structure, otherwise the combined elastic springback of the four bottom flaps typically will cause the box to rise up off the conveyor belt, often resulting in misalignments, jamming, and other conveyance problems. Such elastic springback is inherent in most materials, including those used to manufacture boxes. The elastic springback in the boxes is preferably overcome to assure continuous and reliable box conveyance and to prevent the interruptions and downtime to the production line resulting from boxes losing contact with the conveyer belt, becoming misaligned, and ultimately causing jams and other such problems. The unsealed boxed must be held against the conveyer belt prior to filling and must additionally be held subsequent to filling if the fill material is light or contains a great proportion of lightweight packing material that is of insufficient weight to overcome the aforementioned elastic springback.

One method known in the art of countering the elastic springback inherent in the folded but unsealed bottom flaps of a carton is to employ forward-angled rollers on either side of a carton as they travel down the conveyor belt. The forward-angled rollers have the tendency to drive the box in a downward direction toward the conveyor belt as the box moves forward, thus retaining the box on the conveyor belt. Such forward-angled rollers have been used in other box-moving conveyor systems wherein it is desired to retain a box on a conveyor belt.

Inasmuch as box erecting machines and box conveyors of the type described above are rather complex and expensive machines that are permanently installed in production lines and are capable of being set up to assemble and transport boxes of different sizes. Such machines typically contain adjustable guide rails that may include roller to maintain the boxes in proper orientation.

One such type of machine utilizes both a stationary guide and an adjustable guide that is adjusted to correspond with the width of the box being transported. One reason for designing machinery to contain a fixed guide and a moveable guide is to permit the boxes, as they are assembled and filled, to travel along a fixed, constant "index" line. Inasmuch as the cartons are assembled for the purpose of carrying goods, the goods must, at some point, be loaded into the boxes. Boxes which travel through a production line along a fixed index line are more easily filled than boxes that are delivered centered along a conveyor system inasmuch as such centered cartons typically require a longer reach by the individual or the machinery which fills the box. Boxes traveling along a common index line can be filled directly from the index line with minimal reach and minimal wasted effort. Additionally, the use of a common index line for the filling of boxes expedites the setup of automated machinery used for filling such boxes. Such machinery has not, however, utilized forward-angled rollers to retain a box on a conveyor belt.

The invention disclosed in U.S. Pat. No. 5,735,378 to Sundquist discloses a conveyor system utilizing forward-angled rollers to hold a carton downward on a conveyor system as the carton is transported. While the invention disclosed in Sundquist has achieved success for the purposes disclosed therein, Sundquist does not disclose a carton conveyor system capable of delivering boxes of different sizes along a common index line.

Thus, a need exists for a conveyor system that can retain an empty box on a conveyor belt, that can deliver boxes of different sizes along a common index line, and that can function cooperatively with other box erecting and box taping machines which utilize a common index line and which are known and understood in the relevant art.

SUMMARY OF THE INVENTION

In view of the foregoing, an objective of the present invention is to provide a conveyor system that can overcome the elastic springback inherent in the folded but unsealed bottom flaps of a box.

Another objective of the present invention is to provide a conveyor system that can retain an empty box on a conveyor belt.

Another objective of the present invention is to provide a conveyor system that utilizes forward-angled rollers to retain an empty box on a conveyor belt.

Another objective of the present invention is to provide a conveyor system that can deliver boxes of different sizes along a common index line.

Another objective of the present invention is to provide a conveyor system utilizing forward-angled rollers to retain a box on a conveyor belt and that is readily adjustable for use with boxes of different sizes.

Another objective of the present invention is to provide a conveyor system having a set of forward-angled rollers rotationally mounted on an adjustable support rail.

Another objective of the present invention is to provide a conveyor system that can transport folded but unsealed boxes.

Another objective of the present invention is to provide a conveyor system that can transport empty boxes and minimize the potential for jamming and other conveyance problems.

Another objective of the present invention is to provide a conveyor system that can cooperate functionally with box erecting and sealing machines known and understood in the relevant art.

Another objective of the present invention is to provide a conveyor system that can overcome the elastic springback inherent in folded but unsealed bottom flaps of boxes to reliably transport empty or lightly loaded boxes.

These and other objectives and advantages of the invention are obtained from the conveyor system for retaining an empty box invention, the general nature of which can be stated as including a frame, a plurality of non-adjustable angled rollers mounted on the frame, a movable support rail adjustably mounted on the frame, a plurality of adjustable angled rollers mounted on the movable support rail, and a conveyor belt disposed at least partially between the non-adjustable angled rollers and the movable support rail.

BRIEF DESCRIPTION OF THE DRAWINGS

The preferred embodiment of the invention, illustrative of the best mode in which Applicant has contemplated applying the principles of the invention, is set forth in the following description and is shown in the drawings and is particularly and distinctly pointed out and set forth in the appended claims.

FIG. 4 is a left side elevational view, partially in section, of the conveyor system of the present invention used with a wide box;

FIG. 6 is a sectional view of the conveyor system of the present invention as shown along line 6—6 of FIG. 4.

Similar numerals refer to similar parts throughout the specification.

DESCRIPTION OF THE PREFERRED EMBODIMENT

Figure 1:
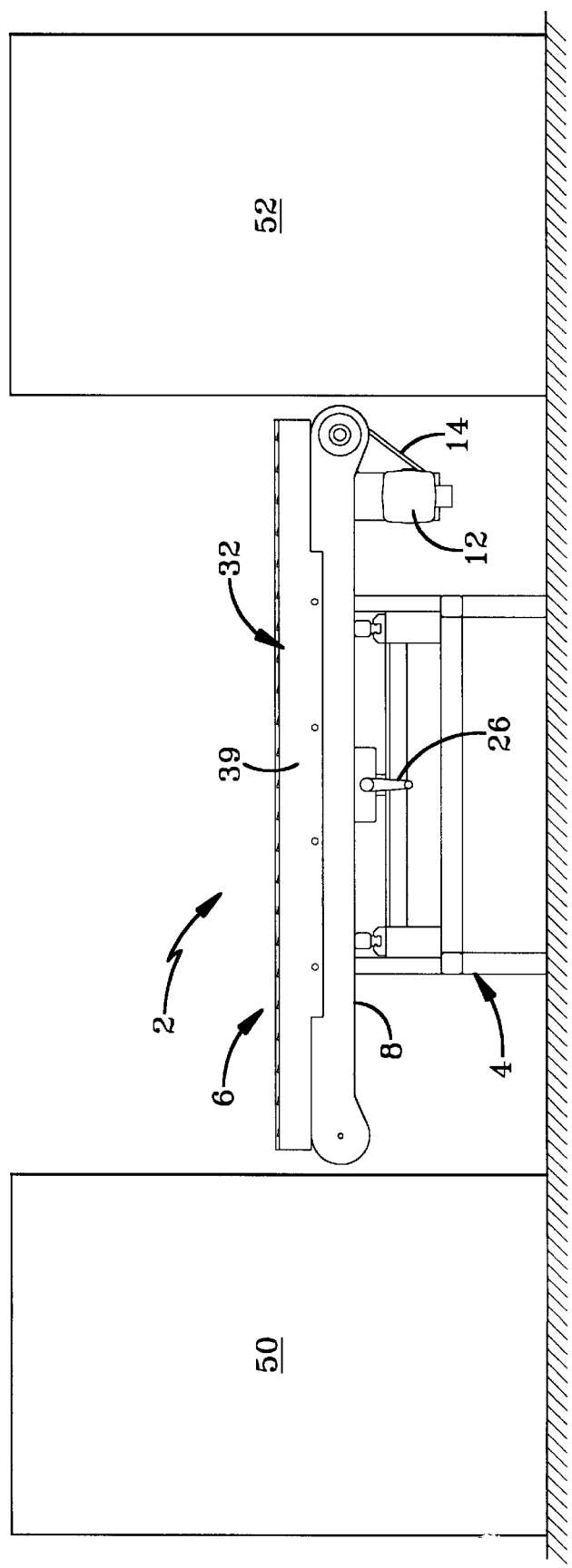
FIG. 1 is a front elevational view of the conveyor system of the present invention with its position shown relative to other machinery.
Figure 2:
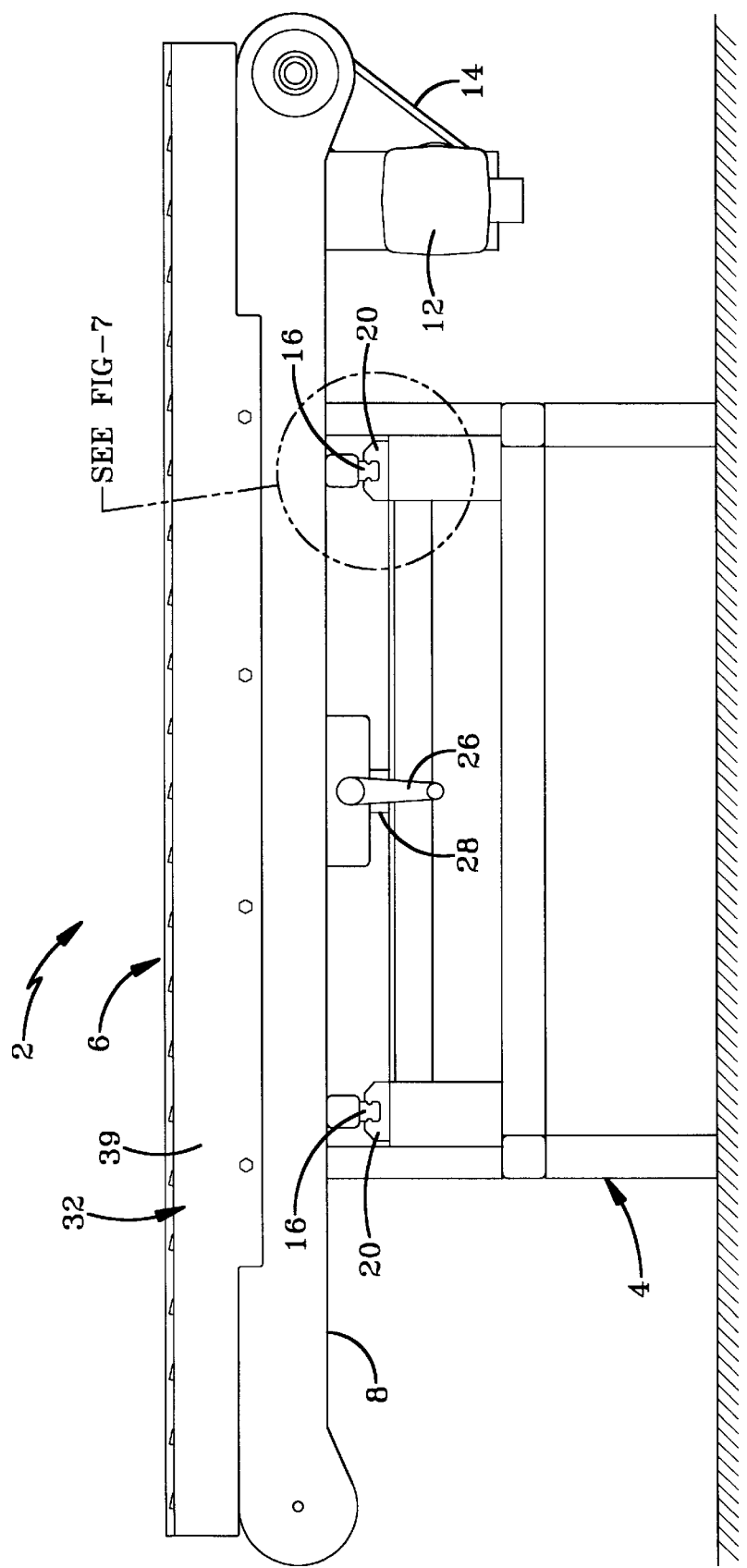
FIG. 2 is a front elevational view of the conveyor system of the present invention.
Figure 3:
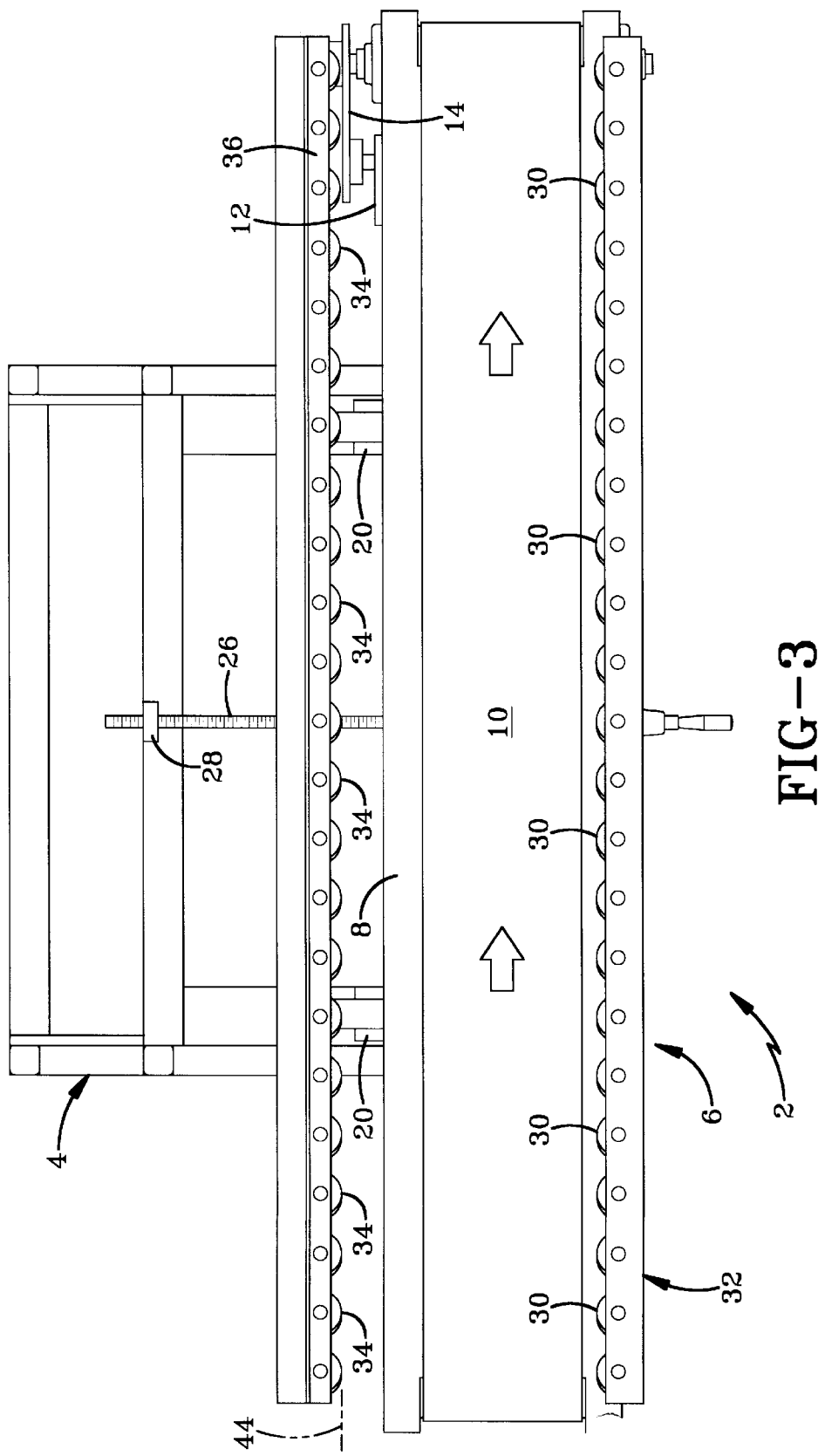
FIG. 3 is a plan view of the conveyor system of the present invention.

The conveyor system of the present invention is indicated generally by the numeral 2 in the accompanying drawings. Conveyor system 2 includes a frame 4 upon which is mounted a conveyor assembly 6. Conveyor assembly 6 includes a conveyor frame 8 about which is driven a conveyor belt 10. Conveyor belt 10 is a conventional conveyor belt known and understood in the relevant art. Conveyor belt 10 is driven by a drive motor 12 that is operatively connected with conveyor belt 10 by a belt 14. In the other embodiments of the present invention, conveyor assembly 6 may include a plurality of powered rollers instead in place of conveyor belt 10 or other similar conveying devices other than belt 10.

Figure 7:
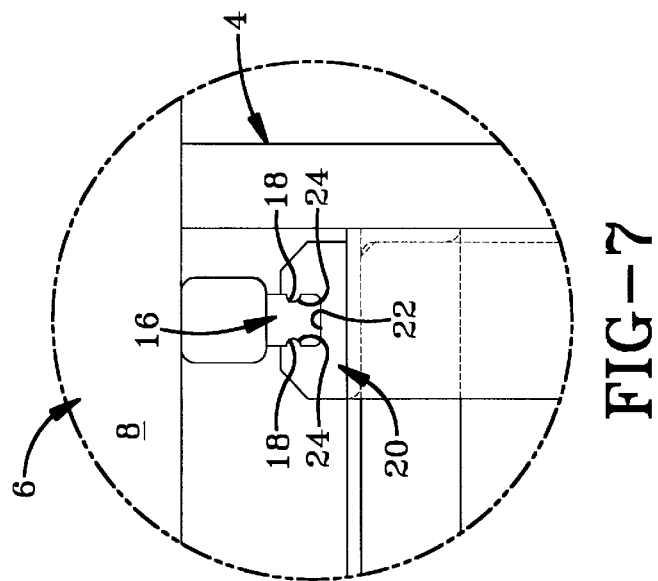
FIG. 7 is an enlarged view of the encircled portion of the conveyor system of the present invention shown in FIG. 2.

Conveyor assembly 6 is slidably mounted on frame 4 by the sliding engagement of a pair of bars 16 attached to conveyor assembly 6 with a corresponding pair of saddles 20 attached to frame 4. Bars 16 are mounted transverse to the operative direction of movement of conveyer belt 10. As best shown in FIG. 7, each bar 16 is an elongated body containing a pair of indentations 18 on opposite sides of bar 16 and extending the length thereof. Each saddle 20 has a channel 22 of a cross section corresponding with that of bar 16. As can be seen in FIG. 7, each saddle 20 contains a pair of dimples 24 on opposite sides of channel 22 and extending the length thereof. The cross section of bar 16 corresponds with the cross section of channel 22, and dimples 24 correspond with indentations 18 such that bar 16 is slidably mounted within channel 22 of saddle 20. In accordance with the objectives of the invention, and as seen in FIG. 7, the cooperation of indentations 18 with dimples 24 permits bar 16 to slide within channel 22, yet prevents substantially any movement of bar 16 in a direction other than longitudinal with respect to the length of bar 16. In accordance with the features of the present invention, the interaction of indentations 18 with dimples 24 enhances the structural stability of conveyor system 2 by maintaining conveyor assembly 6 in a substantially stable, planar relationship with frame 4.

Figure 5:
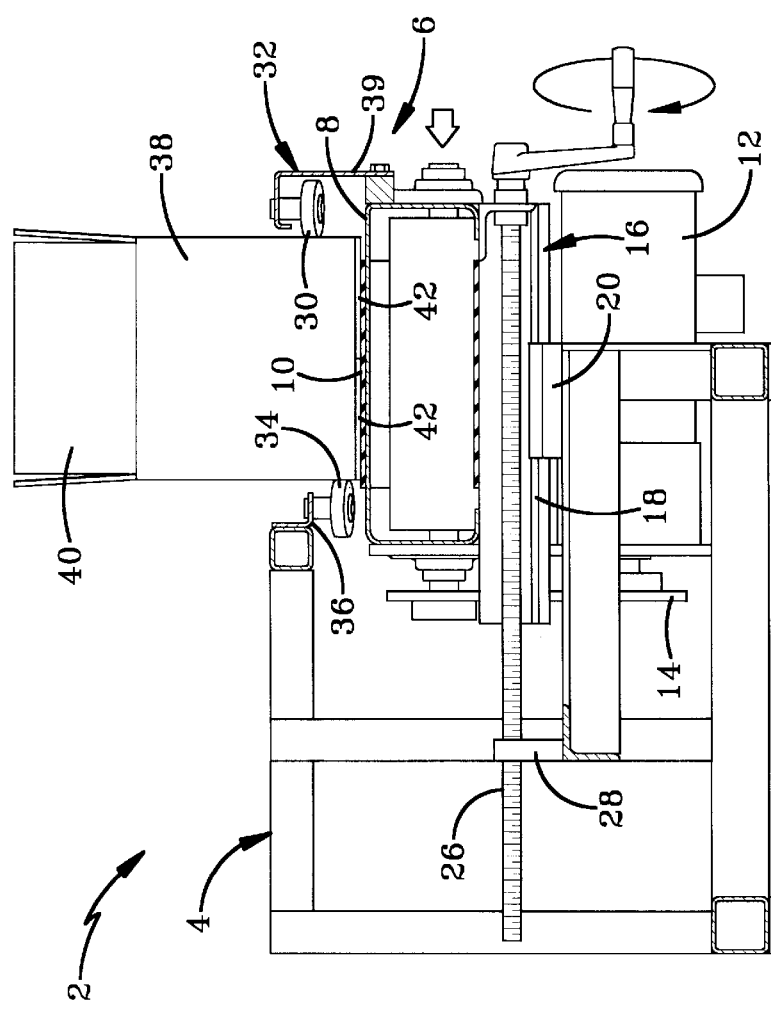
FIG. 5 is a left side elevational view partially in section of the conveyor system of the present invention used with a different box than in FIG. 4.

Conveyor assembly 6 is slidably adjusted with respect to frame 4 by operation of a threaded adjustment crank 26 rotationally mounted on conveyor assembly 6 and threadedly connected with a threaded block 28 attached to frame 4. In accordance with the objectives of the present invention, and as shown in FIG. 5, the selective rotation of adjustment crank 26, with the corresponding threaded interaction of adjustment crank 26 with block 28, causes conveyor assembly 6 to move slidably between inward and outward positions with respect to frame 4. In other embodiments of the present invention, threaded block 28 may be attached to conveyor assembly 6 with adjustment crank 26 rotationally mounted on frame 4.

In accordance with the objectives of the invention, a first set of rollers 30 is rotationally mounted to a movable support rail 32 fixedly attached to conveyor frame 8. A corresponding second set of rollers 34 is rotationally mounted to a fixed support rail 36 which is, in turn, fixedly attached to frame 4. An index line 44 is defined along a reference plane extending upwardly from the outermost edges of rollers 34 facing rollers 30. Rails 32 and 36 are preferably parallel and spaced apart.

Each roller 30 and 34 is of a type known and understood in the art for the purpose of engaging a cardboard box. Rollers 30 and 34 are preferably of a durable rubber-type compound, although other materials and compounds may be used for the manufacture of rollers 30 and 34 without departing from the spirit of the present invention.

As can be seen in FIG. 6, rollers 30 and 34 are axially mounted to rails 32 and 36, respectively, and the axis of rotation of rollers 30 and 34 is angled from vertical. FIG. 6 depicts a box 38 and an arrow, indicated by the letter A, indicating the travel direction of box 38 as it is transported by conveyor belt 10. The rotational axis of each of rollers 30 and 34 is angled forward in the direction of arrow A at an angle in the range of approximately 10° to 30°, although angles greater and lesser may be used without departing from the spirit of the present invention. The rotational axis of each of rollers 30 and 34 is preferably the same such that each of rollers 30 and 34 rotate about axes that are parallel and spaced apart. The forward rotational alignment of rollers 30 and 34 causes box 38 to be driven against conveyor belt 10 as box 38 is translated by conveyor belt 10.

In use, adjustment crank 26 is turned until box 38 fits snugly between rollers 30 and rollers 34. As is known and understood in the relevant art, rollers 30 and 34 have at least a nominal resilient character. Moreover, as can be seen in FIG. 4, movable support rail 32 includes a vertical member 39 between its point of attachment with conveyor frame 8 and the mount for each of rollers 30. Vertical member 39 may be configured or designed to possess its own resilient character. Fixed support rail 36 may also be configured to possess its own resilient character.

In accordance with the objectives of the present invention, with rollers 30 and 34 snugly contacting box 38, the forward motion of conveyor belt 10 in the direction of arrow A (FIG. 6) causes rollers 30 and 34 to rotate about their respective axes, thus driving box 38 against conveyor belt 10 in a manner known and understood in the relevant art. As such, rollers 30 and 34 have a sliding contact with box 38 and provide a constant downward force on box 38 against conveyor belt 10.

The retention of box 38 on conveyor belt 10 by rollers 30 and 34 provides a number of advantages. For example, as is shown in FIG. 4, box 38 contains a set of upper flaps 40 and a set of lower flaps 42. Upper flaps 40 are unfolded, and lower flaps 42 are shown to be folded but not sealed. In the absence of rollers 30 and 34, the elastic springback inherent in lower flaps 42 would likely cause empty box 38 to be pushed away from conveyer belt 10 and out of proper alignment between rails 32 and 36, thus resulting in jams and other conveyance problems. Rollers 30 and 34 thus overcome the problems known in the art associated with the elastic springback inherent in box flaps. Rollers 30 and 34 retain empty and lightly loaded boxes against conveyer belt 10 and overcome the elastic springback inherent therein. Even if lower flaps 42 of box 38 are sealed in place, rollers 30 and 34 still assist in retaining box 38 against conveyor belt 10, thus inhibiting jams and other such conveyance problems inherent in the conveyance of boxes.

As can be seen in FIG. 4, conveyor belt 10 is positioned substantially between rollers 30 and rollers 34, although conveyor belt 10 is not centered therebetween. Box 38, as shown in FIG. 4, extends a certain distance beyond the edge of conveyor belt 10 before it contacts rollers 34. Such overlap is irrelevant to the present invention inasmuch as rollers 30 and 34 urge box 38 against conveyor belt 10. Similarly, rollers 30 and rollers 34 are depicted in the accompanying drawings as being at different heights with regard to conveyor belt 10. Again, such height differential does not interfere with the proper functioning of the present invention, and rather enhances the versatility thereof by permitting conveyor system 2 to accommodate boxes of a wide variety of sizes.

In accordance with the objectives of the present invention, and as can be seen in FIG. 5, rollers 30 are each mounted to rail 32 which is, in turn, attached to conveyor assembly 6. Thus, adjustment of conveyor assembly 6 by rotation of adjustment crank 26 causes rollers 30 to simultaneously move inwardly and outwardly as desired. The simplified adjustment inward and outward of rollers 30 with respect to roller 34 permits conveyor system 2 to be quickly adjusted to accommodate boxes of different widths. The expedited setup of conveyor system 2 results in significant savings in cost and time beyond that provided by devices previously known and understood in the relevant art.

In accordance with the features of the invention, box 38 travels against index line 44 at it is moved by conveyer belt 10. As indicated hereinbefore, the use of an index line in a conveyer system is known in the packaging arts to provide significant benefits in time, effort, and cost. Index line 44 of conveyer system 2 can be aligned with the index lines of other devices known in the art such the box erecting machine 50 and the taping machine 52, depicted in FIG. 1, to create a common index line shared with all of the packaging machinery in a production line. Conveyer system 2 can work with other packaging machinery known in the art and can be easily incorporated into an assembly line therewith, thus providing substantial benefits to the user. The configuration depicted in FIG. 1 allows boxes to be erected from blanks in apparatus 50 and then ejected onto conveyor system 2 of the present invention where the boxes are loaded by workers or by automated machinery. Conveyor system 2 holds the empty boxes in the proper position until they are loaded and then maintains their proper alignment until they are fed into taping machine 52 where the bottom and top of each box is appropriately sealed. Each machine 50 and 52 typically has a fixed index line where all adjustments are taken from. The index line of conveyor system 2 allows it to be readily fit between machines 50 and 52 and adjusted in a similar manner.

Accordingly, the improved conveyor system for retaining an empty box invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the conveyor system for retaining an empty box invention is constructed and used, the characteristics of the construction, and the advantageous new and useful results obtained; the new and useful structures, devices, elements, arrangements, parts, and combinations are set forth in the appended claims.

I claim:

1. A conveyor system having an index line for transporting and retaining an empty box against said index line, said conveyor system comprising:
   a frame;
   a plurality of first angled rollers rotatably mounted on said frame;
   a movable support rail adjustably mounted on said frame;
   a plurality of second angled rollers rotatably mounted on said movable support rail; and
   a conveyor means disposed at least partially between said first angled rollers and said movable support rail, wherein said second plurality of angled rollers remains stationary with respect to the index line while said first plurality of angled rollers is movable inwardly and outwardly from said second plurality of angled rollers and said index line.

2. The conveyor system as set forth in claim 1 wherein the conveyor means comprises a conveyor belt.

3. The conveyor system as set forth in claim 2 in which each of said rollers rotates about an axis angled forward from vertical in the direction of operative movement of said conveyor belt.

4. The conveyor system as set forth in claim 3 in which said axes of rotation of said rollers are parallel with one another.

5. The conveyor system as set forth in claim 3 further comprising a conveyor frame selectively slidably mounted on said frame, said conveyor belt mounted on said conveyor frame.

6. The conveyor system as set forth in claim 5 in which said movable support rail is mounted on said conveyor frame.

7. The conveyor system as set forth in claim 6 further comprising a bar and a saddle formed with a channel, said conveyor frame mounted on said bar, said saddle mounted on said frame, said bar selectively slidably mounted in said channel said bar and said channel being of cooperative cross sections such that the interaction of said bar and said channel permits movement of said conveyer frame only in a direction transverse to the operative direction of movement of said conveyor belt.

8. The conveyor system as set forth in claim 7 wherein said bar and said channel are of cooperative cross sections such that the interaction of said bar and said channel permits movement of said conveyor frame only in a direction transverse to the operative direction of movement of said conveyor belt.

9. The conveyor system as set forth in claim 1 further comprising a threaded adjustment crank movable with said movable support rail and a threaded block carried by said frame; said threaded adjustment crank threadedly engaging said threaded block.

10. A method of adjusting a conveyor system having an index line for transporting and retaining an empty box against said index line, said method comprising the steps of:
    providing a frame;
    providing a first set of angled rollers rotatably mounted on said frame;
    providing a movable support rail adjustably mounted on said frame;
    providing a conveyor means disposed at least partially between said first set of angled rollers and said movable support rail;
    adjusting the second set of angled rollers, the conveyor means being positioned at least partially therebetween;
    placing the box on the conveyor belt; and
    translating the conveyor means, and the first set of angled rollers toward the second set of angled rollers until the box is engaged by both sets of angled rollers, wherein the second set of angled rollers remain stationary relative to the index line.

11. A method of claim 10 wherein the step of translating the conveyor means and the first set of angled rollers includes the step of rotating a crank to cause the conveyor means and first set of angled rollers to translate.

12. The method as set forth in claim 10 wherein the conveyor means comprises a conveyor belt.

13. The method as set forth in claim 12 in which each of said rollers rotates about an axis angled forward from vertical in the direction of operative movement of said conveyor belt.

14. The method as set forth in claim 12 in which said axes of rotation of said rollers are parallel with one another.

15. The method as set forth in claim 14 further comprising a conveyor frame selectively slidably mounted on said frame, said conveyor belt mounted on said conveyor frame.

16. The method as set forth in claim 15 in which said movable support rail is mounted on said conveyor frame.

17. The method as set forth in claim 16 further comprising a bar and a saddle formed with a channel, said conveyor frame mounted on said bar, said saddle mounted on said frame, said bar selectively slidably mounted in said channel said bar and said channel being of cooperative cross sections such that the interaction of said bar and said channel permits movement of said conveyor frame only in a direction transverse to the operative direction of movement of said conveyor belt.

18. The method as set forth in claim 17 wherein said bar and said channel are cooperative cross sections such that the interaction of said bar and said channel permits movement of said conveyor frame only in a direction transverse to the operative direction of movement of said conveyor belt.

19. The method as set forth in claim 9 further comprising a threaded adjustment crank moveable with said movable support rail and a threaded block carried by said frame; said threaded adjustment crank threadedly engaging said threaded block.

20. A conveyor system for transporting and retaining an empty box, said conveyor system comprising:
   a frame;
   a plurality of first angled rollers rotatably mounted on said frame;
   a movable support rail adjustably mounted on said frame;
   a plurality of second angled rollers rotatably mounted on said movable support rail;
   a conveyor means disposed at least partially between said first angled rollers and said movable support rail; and
   a conveyor frame selectively slidably mounted on said frame, said conveyor means mounted on said conveyor frame, wherein each of said rollers rotates about an axis angled forward form vertical in the direction of operative movement of said conveyor means.

21. The conveyor system as set forth in claim 20 wherein the conveyor means comprises a conveyor belt.

22. The conveyor system as set forth in claim 20 in which said axes of rotation of said rollers are parallel with one another.

23. The conveyor system as set forth in claim 21 in which said movable support rail is mounted on said conveyor frame.

24. The conveyor system as set forth in claim 23 further comprising a bar and a saddle formed with a channel, said conveyor frame mounted on said bar, said saddle mounted on said frame, said bar selectively slidably mounted in said channel said bar and said channel being of cooperative cross sections such that the interaction of said bar and said channel permits movement of said conveyor frame only in a direction transverse to the operative direction of movement of said conveyor belt.

25. The conveyor system as set forth in claim 24 wherein said bar and said channel are of cooperative cross sections such that the interaction of said bar and said channel permits movement of said conveyor frame only in a direction transverse to the operative direction of movement of said conveyor belt.

26. The conveyor system as set forth in claim 25 further comprising a threaded adjustment crank movable with said movable support rail and a threaded block carried by said frame; said threaded adjustment crank threadedly engaging said threaded block.

27. A method of adjusting a conveyor system, said method comprising the steps of:
   providing a frame;
   providing a first set of angled rollers rotatably mounted on said frame;
   providing a movable support rail adjustably mounted on said frame;
   providing a second set of angled rollers rotatably mounted on said movable support rail;
   providing a conveyor means disposed at least partially between said first set of angled rollers and said movable support rail;
   providing a conveyor frame selectively slidably mounted on said frame, said conveyor means mounted on said conveyor frame, wherein rollers rotate about an axis angled forward from vertical in the direction of operative movement of said conveyor means,
   adjusting the movable support rail having the first set of angled rollers to a position a desired distance form the second set of angled rollers, the conveyor means being positioned at least partially therebetween;
   placing the box on the conveyor means; and
   translating the conveyor means, and the first set of angled rollers toward the second set of angled rollers until the box is engaged by both sets of angled rollers.

28. The method as set forth in claim 27 wherein the conveyor means comprises a conveyor belt.

29. The method as set forth in claim 27 in which said axes of rotation of said rollers are parallel with one another.

30. The method as set forth in claim 29 in which said movable support rail is mounted on said conveyor frame.

31. The method as set forth in claim 30 further comprising a bar and a saddle formed with a channel, said conveyor frame mounted on said bar, said saddle mounted on said frame, said bar selectively slidably mounted in said channel said bar and said channel being of cooperative cross sections such that the interaction of said bar and said channel permits movement of said conveyor frame only in a direction transverse to the operative direction of movement of said conveyor belt.

32. The method as set forth in claim 31 wherein said bar and said channel are of cooperative cross sections such that the interaction of said bar and said channel permits movement of said conveyor frame only in a direction transverse to the operative direction of movement of said conveyor belt.

33. The method as set forth in claim 32 further comprising a threaded adjustment crank movable with said movable support rail and a threaded block carried by said frame; said threaded adjustment crank threadedly engaging said threaded block.

* * * * *